April 7, 1964    R. O. CASE, JR    3,128,461
CLUTTER MINIMIZER FOR MONOPULSE RADAR
Filed Nov. 3, 1960    3 Sheets-Sheet 1

INVENTOR.
ROBERT O. CASE JR.

BY *Edward P. Sokoleski*

AGENT

April 7, 1964  R. O. CASE, JR  3,128,461
CLUTTER MINIMIZER FOR MONOPULSE RADAR
Filed Nov. 3, 1960  3 Sheets-Sheet 2

INVENTOR.
ROBERT O. CASE JR.
BY Edward A. Sokolski
AGENT

INVENTOR.
ROBERT O. CASE JR.
BY Edward A. Sokolski
AGENT

United States Patent Office 3,128,461
Patented Apr. 7, 1964

3,128,461
CLUTTER MINIMIZER FOR MONOPULSE RADAR
Robert O. Case, Jr., La Habra, Calif., assignor to
North American Aviation, Inc.
Filed Nov. 3, 1960, Ser. No. 67,035
11 Claims. (Cl. 343—16)

This invention relates to a clutter minimizer for monopulse radar and more particularly to apparatus for enabling the detection of small target signals in the presence of large clutter signals.

The detection of airborne targets by means of radar is often seriously hampered or completely prevented due to the presence of extraneous echo signals. Such undesired echo signals which are generally caused by back-scattered enegy from the ground and objects on the ground are often much larger than the echo from the target and therefore obscure the target echo. Such interfering signals are generally referred to as "ground return" or "clutter." Clutter effects are also encountered over water where the surface of the water is choppy. This undesirable interference effect is most pronounced in those cases where both the target and a portion of the surface of the land or water are at the same range within the beam of the radar antenna.

Various means have been attempted to enable the detection of airborne targets in the presence of clutter signals. These solutions are of two general categories: (1) the use of a highly directional antenna and (2) the use of moving target indicator (MTI) or pulse Doppler techniques.

The method incorporating the use of a highly directional antenna attempts to discriminate in favor of the target by virtue of the target elevation above the ground. In this approach an attempt is made to provide an antenna so highly directional that it will illuminate only the target and not the ground. This technique is objectionable from at least two standpoints. Firstly, it takes an objectionably long time to search out a given volume of space with an extremely narrow antenna beam. Secondly, in order to get the required narrow beam, either an antenna of very large physical dimensions must be used, or the transmission frequency must be extremely high. Atmospheric absorption is prohibitively high at extremely high transmission frequencies, and consequently the required narrow antenna beam can generally only be attained by using an antenna of such large physical dimensions as to be impracticable for airborne use. Generally, therefore, only large ground based radars use this approach. Such ground based radars employ a transmission frequency low enough to avoid atmospheric effects, have huge antennas, and generate a "stacked beam" pattern to reduce search time. This approach, in itself, often does not give entirely satisfactory discrimination results and moving target discrimination techniques are often used in conjunction therewith.

The second approach to the detection of targets in the presence of clutter operates on the assumption that an airborne target is also a moving target. Target discrimination by this method is based on the fact that there is a different Doppler frequency in the target echo as compared with the clutter. If properly carried out, moving target detection techniques can be quite effective. However, the proper mechanization of this technique involves a degree of system complexity and sophistication which makes such techniques highly objectionable both from the point of view of the size and weight of the equipment involved and the reliability problems imposed thereby. Such techniques also fail to give an indication under certain circumstances, such as, for example, where the target is not moving substantially in range relative to the radar antenna.

The device of this invention is a simple yet effective means for detecting target signals in the presence of clutter which overcomes most of the above enumerated shortcomings of presently used techniques. The device of the invention can be incorporated into most monopulse radar systems with very little additional cost and modification to such systems. Neither the large bulky antenna of the narrow beam approach nor the complicated circuitry involved in MTI and Doppler techniques are needed. The desired end results are achieved without a significant impairment of the reliability of the normal monopulse radar system nor an increase in the system maintenance requirements.

In the device of the invention, the detection of targets in the presence of clutter is accomplished by utilizing a by-product of a monopulse radar system, namely, the quadrature error signal, which is present in the monopulse radar receiver but which is normally discarded. This quadrature error signal is generated in the phenomenon associated with the mutual interference between a target signal and clutter signals which are separated in elevation angle from the centerline of the radar antenna. This quadrature error signal is detected from the signals received in the monopulse error channel and fed to the radar indicator.

It is therefore an object of this invention to improve the performance of a monopulse radar system.

It is a further object of this invention to provide a simple yet effective means for enabling the detection of target signals in the presence of strong clutter signals.

It is still another object of this invention to provide a clutter minimizer which utilizes the quadrature component of the elevation error signal in a monopulse radar to enable the detection of target signals in the presence of clutter.

It is a still further object of this invention to provide simple yet effective means for incorporating clutter minimization circuitry in a conventional monopulse radar system.

Other objects of this invention will become apparent from the following description taken in conjunction with the accompanying drawings in which FIG. 1 illustrates the basic operation of the device of the invention;

Figure 4:
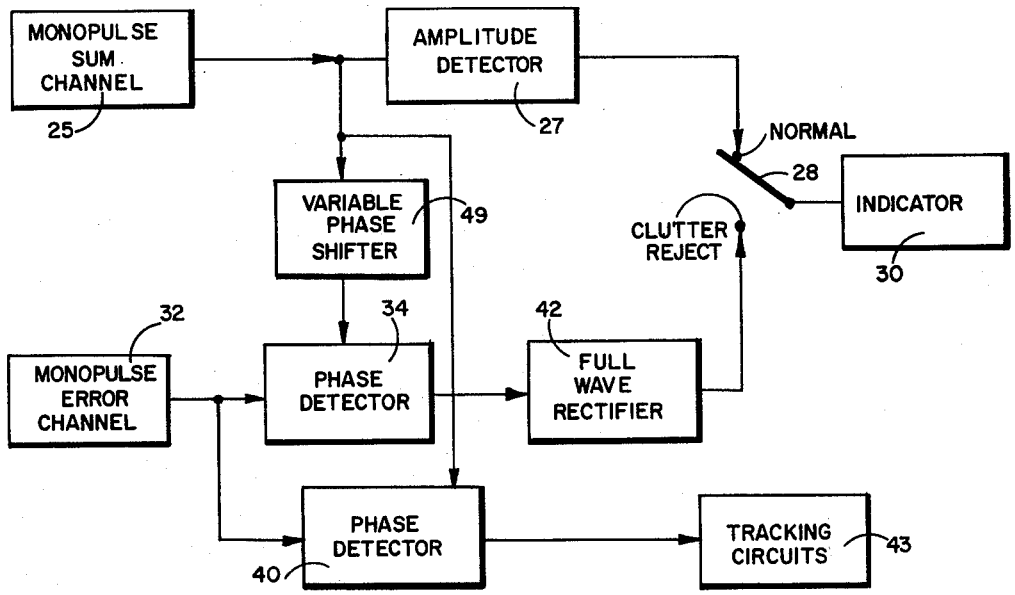
FIG. 4 is a block diagram illustrating a third embodiment of the device of the invention.
Figure 5:
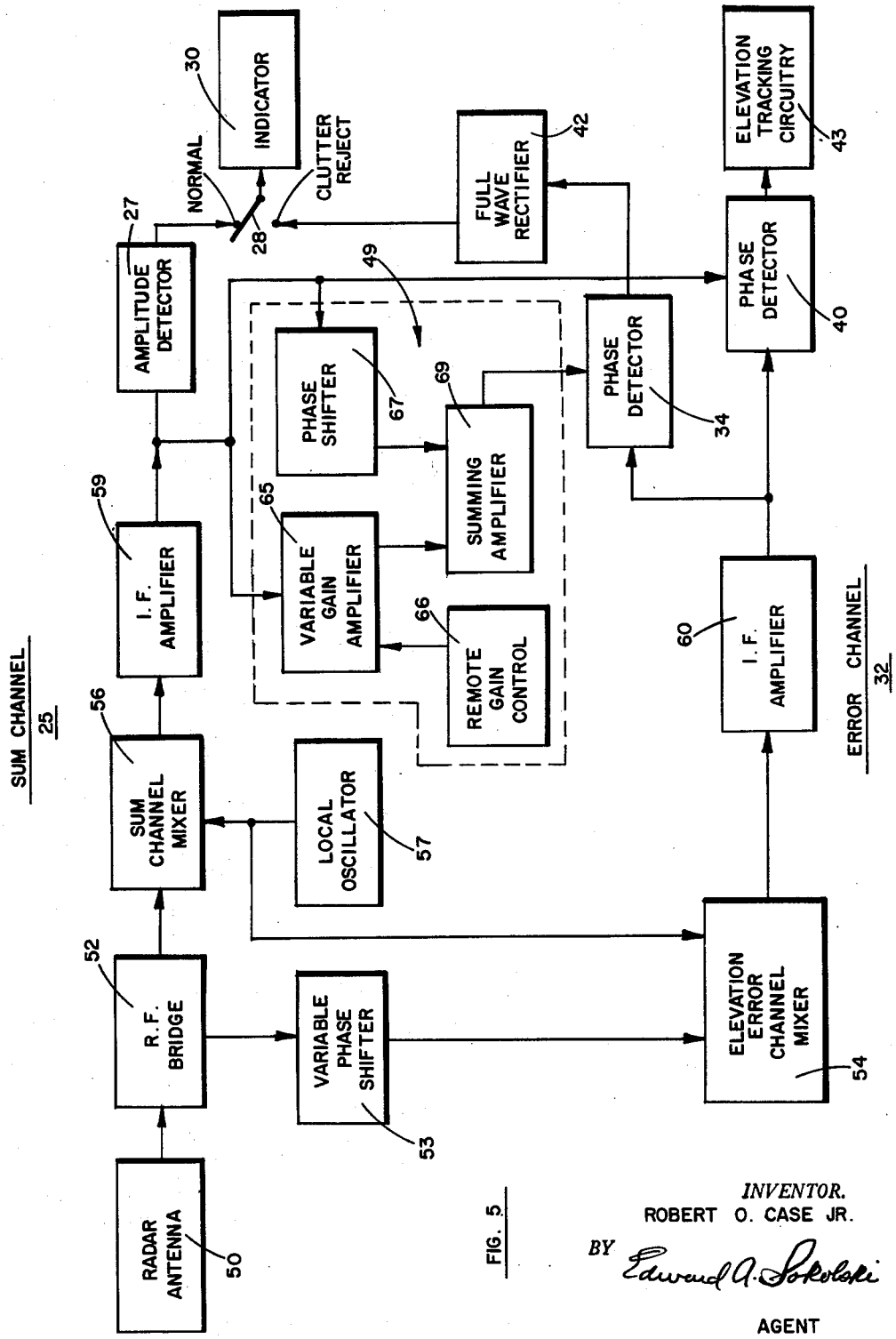

And, FIG. 5 is a block diagram illustrating the detailed features of the embodiment illustrated in FIG. 4.

As already noted, the device of the invention makes use of phenomenon associated with the mutual interference of two or more sources of electromagnetic energy which are separated in angle from each other as related to the point of reception of the energy therefrom. Such mutual interference results in the generation of a signal having a quadrature phase relationship with the normally utilized echo signal from the target. In a well-designed and well-adjusted monopulse radar system, a point target produces no such quadrature signal.

Figure 1:
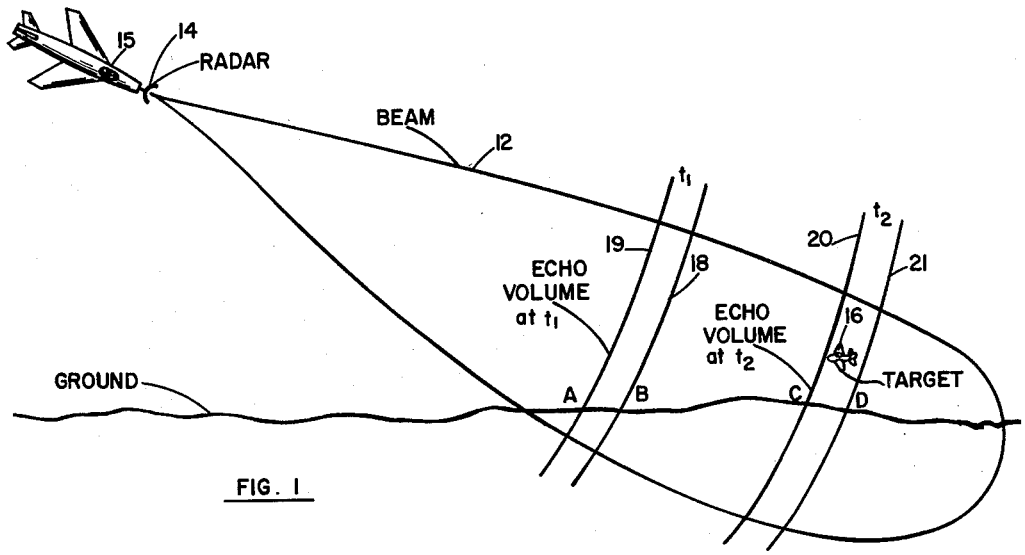

Referring now to FIG. 1, the effects of the generation of an elevation beam 12 from radar 14 installed in aircraft 15 are illustrated. As viewed in the elevation plane, the echo from the ground, at a given instant of time after a transmitted pulse, appears to be from a point source. Echoes from objects on the ground at substantially different elevation (or depression) angles are generally at different ranges and are received at different times. Such signals, therefore, do not interfere with each other. At time $t_1$, as illustrated in FIG. 1, echoes are received from the volume defined by the beamwidth, the pulsewidth, and the elapsed time, $t_1$, as indicated by the lines 18 and 19 running through the points A and B on the ground. The only objects appearing within this volume, which will give rise to echoes, are objects on the ground between points A and B. The angle subtended by points A and B at the radar is so small as to be negligible and, therefore, for reasons to be explained further on in the specification, little or no quadrature signal is generated as a result of the interference between these echo signals.

While points C and D appear at a much larger angle from the radar antenna centerline than do points A and B, the echoes from these points will not be received till time $t_2$ and, therefore, do not interfere with the echoes from points A and B.

At time $t_2$, echoes are received from the volume defined by lines 20 and 21. This includes not only the points on the ground between points C and D, but also the echoes from target 16. Target 16 being at a substantially different depression angle from radar antenna 14 than points C and D will, in view of its substantially simultaneous arrival at the radar 14 as the echoes from the points on the ground between points C and D, produce an interference signal which has a substantial quadrature component. It is this quadrature component of the echo signals, simultaneously received from the target and the ground, which is detected in the device of the invention and fed to the radar indicator to produce a signal indicative of the presence of the target. If the target were not present, there would be no such quadrature signal to be detected or to be displayed.

The device of this invention is suitable for use with most typical monopulse radar systems. A monopulse radar system in which the device of this invention may be utilized may be defined as any receiving system which, in response to a distant point source of electromagnetic radiation, produces at least two simultaneous signals whose amplitude ratio is a function of the geometrical angle of the source of radiation relative to the antenna pointing direction but whose relative electrical phase angle is not a substantial quantitative function of this geometrical angle. There are monopulse systems in which at one point in the system the phase angle between the signals is indicative of this geometrical angle, but in such systems, the signals are generally processed to produce an amplitude ratio. (It is to be noted that the phase relationship between these signals is used in a typical monopulse system as an indication of the sense of the deviation of the source of radiation from the antenna pointing direction.) These two simultaneously produced signals are generally referred as the sum or range signals and the error signals. A typical monopulse radar system, in which the device of the invention can be incorporated, is described and illustrated in Patent No. 2,933,980, issued April 26, 1960, J. R. Moore et al., inventors, assigned to North American Aviation, Inc.

In such a monopulse system, the sum signal, $\Sigma_c$ and the elevation error signal, $\Delta_c$; from the clutter at a given instant of time can be represented as:

$$\Sigma_c = E_c \qquad (1)$$

and $$\Delta_c = E_c f(\beta_c) \qquad (2)$$

where $E_c$ = the maximum amplitude of the echo from the clutter.
$\beta_c$ = elevation angle of the clutter relative to the radar antenna axis.
$f(\beta_c)$ = functional relationship between amplitude ratio of the sum and error signals and the elevation angle of the clutter relative to the radar antenna axis.

Most practical systems are sufficiently linear up to the point of final detection that the Principle of Superposition will hold. Thus, if clutter and target echoes are received simultaneously, the composite sum and error signals will be the sum of the two sum signals and the two error signals, respectively. The summation must be vectorial, since the target will, in general, have an arbitrary phase angle relative to the clutter. Thus, the sum of the target and clutter sum signals, $\Sigma_{(T+C)}$ may be represented as follows:

$$\Sigma_{(T+C)} = E_c + E_T \cos \phi + jE_T \sin \phi \qquad (3)$$

and the sum of the target and clutter error signals, $\Delta_{(T+C)}$, may be represented as follows:

$$\Delta_{(T+C)} = E_c f(\beta_c) + E_T f(\beta_T) [\cos \phi + j \sin \phi] \qquad (4)$$

where $\phi$ = phase angle between clutter and target.
$\beta_T$ = the elevation angle of the target relative to the radar antenna axis.

and $E_T$ = the maximum amplitude of the echo signal from the target.

It can be shown that the component of a vector which is in quadrature to a second vector is the imaginary component of the product of the first vector and the ratio of the second vector's complex conjugate to its absolute value. Performing the indicated operations on the error signal to determine the value of the quadrature component, $\Delta_{quad}$, with respect to the sum signal, and collecting terms produces the following results:

$$\Delta_{quad} = \frac{[E_c + E_T \cos \phi] E_T f(\beta_T) \sin \phi - E_T \sin \phi [E_c f(\beta_c) + E_T f(\beta_T) \cos \phi]}{\sqrt{[E_c + E_T \cos \phi]^2 + [E_T \sin \phi]^2}}$$

(5)

$$= \frac{E_c E_T \sin \phi [f(\beta_T) - f(\beta_c)]}{\sqrt{E_c^2 + E_T^2 + 2 E_T E_c \cos \phi}}$$

(6)

If the target signal $E_T$ is very much smaller than the clutter signal $E_c$, which is the usual case where the target cannot be discerned above the clutter signals, then Equation 6 can be reduced as follows:

$$\Delta_{quad} \cong E_T \sin \phi [f(\beta_T) - f(\beta_c)] \qquad (7)$$

It can be seen from Equation 7 that for a small target and a large clutter signal the quadrature voltage is proportional to the target signal strength and substantially independent of the clutter signal. Further, the quadrature voltage is proportional to a term which is zero if the target is at the ground and which generally increases as the angular separation of the target and clutter increases. Finally, the clutter signal is modulated in accordance with the phase angle between the target and the clutter signals. The phase angle $\phi$ between the target and the clutter signal goes through one complete cycle for each half-wavelength which the target moves relative to the ground in the direction of the radar. The frequency of the variation of this phase angle is equal to the Doppler frequency of the target relative to the ground.

In a monopulse radar system, such as that disclosed in Patent No. 2,933,980, which has been previously cited, the signals from the sum channel are detected and the video derived therefrom is displayed on the radar indicator. In the device of this invention, means are provided for detecting the quadrature component of the signals received in the error channel. Means are further provided for coupling the detected quadrature signals to the indicator in place of the output of the sum channel when clutter rejection is desired.

Figure 2:
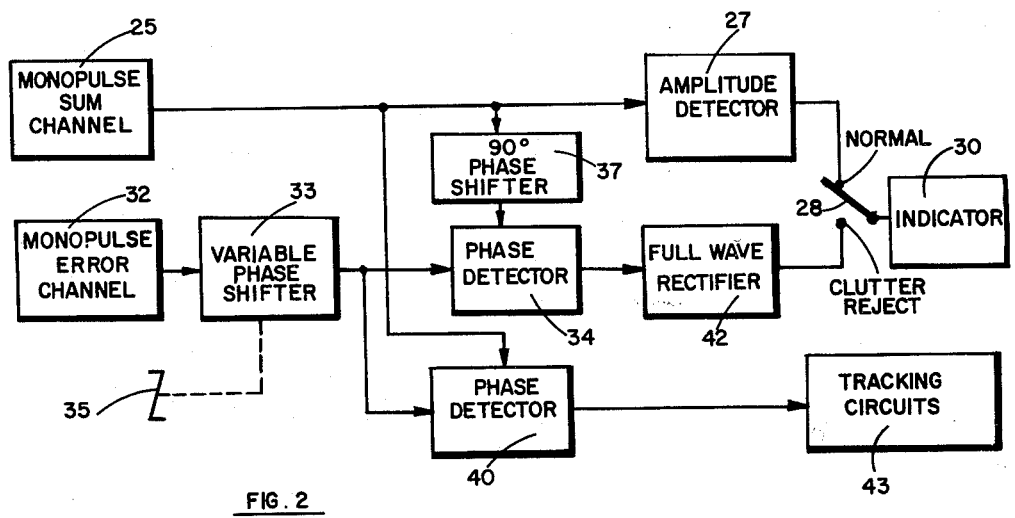
FIG. 2 is a block diagram illustrating a first embodiment of the device of the invention.

Referring to FIG. 2, a first embodiment of the device of the invention for accomplishing this end result is illustrated. With switch 28 in the "normal" position, signals amplified in monopulse sum channel 25 are fed to amplitude detector 27 and sent through switch 28 to indicator 30. This is the normal way in which a monopulse radar operates to produce target signals on an indicator. The device of this invention provides means for displaying, in place of these "normal" video signals, signals which represent the quadrature component of the signals received in the monopulse error channel 32.

The signals from monopulse error channel 32 are fed through variable phase shifter 33 to phase detector 34. The phase shift produced by variable phase shifter 33 may be varied by means of control knob 35 which is mechanically linked thereto. Variable phase shifter 33 may be any conventional phase shift device such as described on pages 478–481 and pages 513–518 of volume 9 of the MIT Radiation Laboratory Series published by McGraw-Hill Book Company. Phase shifter 33 may either be coupled to receive the output of the I-F stage of the monopulse error channel or, if so desired, may be included in the R-F plumbing ahead of the monopulse error channel mixer stage.

Signals are fed from variable phase shifter 33 to phase detector 34. Signals from the monopulse sum channel 25 are phase shifted 90 degrees by phase shifter 37 and fed to phase detector 34 as a reference.

Phase detector 34 may be any phase sensitive detector, such as that illustrated in FIG. 14 of Patent No. 2,933,980, which has been cited above. Such a phase detector will produce an output signal having a polarity and amplitude in accordance with the phase difference between the reference and input signals fed thereto. Maximum positive amplitude output is obtained when the signals are in phase with each other, maximum negative output is obtained when the signals are 180 degrees out of phase with each other, while no output is obtained when the signals are in quadrature, i.e., either 90 degrees or 270 degrees out of phase with each other. For various phase differences between 0 and 90 degrees, a positive output is obtained in accordance with this phase difference. For various signals having phase differences between 90 degrees and 270 degrees, a negative output is obtained in accordance with this phase difference, while for signals having a phase difference between 270 degrees and 360 degrees, an output is obtained which is positive and has an amplitude in accordance with the phase difference.

Phase detector 34 will, therefore, have a maximum positive output when the signals coming from phase shifter 37 to the phase detector are in phase with the signals coming to the phase detector from variable phase shifter 33. Such an in-phase relationship may exist when the signals coming from the monopulse sum channel 25 lead the signals coming from variable phase shifter 33 by 90 degrees. When the signals fed from 90 degree phase shifter 37 to phase detector 34 are 180 degrees out of phase with the signals fed to the phase detector from variable phase shifter 33, phase detector 34 will have a maximum negative output. This condition may exist when the signals from monopulse sum channel 25 have a 270 degree phase relationship with the signals fed from variable phase shifter 33 to phase detector 34, i.e., when the signals from phase shifter 33 lag the output signals from the monopulse sum channel 25 by 90 degrees. Therefore, phase detector 34 will have a maximum positive or neagtive output for input signals from variable phase shifter 33 which have a quadrature relationship with the signals fed from monopulse sum channel 25 to phase shifter 37. Such a quadrature signal (as related to the signals from sum channel 25) would generally only appear in the output of monopulse error channel 32, as already noted, when there is interference between a ground signal and a target signal separated by some significant elevation angle. Consequently, phase detector 34 will have a significant output only when an interfering target and clutter signal are received in the proper relationship in monopulse error channel 32.

It is to be noted that for a normal tracking in monopulse operation that the output of the monopulse error channel 32 is fed through variable phase shifter 33 to phase detector 40. A reference signal is fed to phase detector 40 from monopulse sum channel 25 without any 90 degree phase shift interposed therebetween. The output of phase detector 40, which is indicative of the deviation of the target signal from the radar antenna axis, is fed to the tracking circuits 43. The portions of the output of the monopulse error channel 32, which are in quadrature with the signals from the monopulse sum channel 25, will produce no output from phase detector 40 due to the fact that they are fed to the phase detector in their original quadrature relationship.

The output of phase detector 34, as already noted, can be either positive or negative in polarity. This can be explained by reference to Equation 7 where it can be noted that the sin $\phi$ term, which is in accordance with the phase angle between the clutter and the target, can be either positive or negative in polarity with equal probability. As it is desirable to have an input to indicator 30 of a single polarity, the output of phase detector 34 is rectified by full-wave rectifier 42, which has a unipolar output, which can be used as an input signal to indicator 30. Indicator 30 is connected to the output of full-wave rectifier 42 by throwing switch 28 to the "clutter reject" position when it is desired to detect a target in the presence of clutter.

For proper operation of a monopulse system in a tracking mode it is necessary that there be no phase shift introduced in the error or the sum channels themselves which will cause a phase shift between the signals in these channels. This same requirement is obviously necessary for proper operation of the device of this invention as any relative phase shift between the two channels will cause the clutter to generate error quadrature signals even in the absence of a target. Variable phase shifter 33, which is normally necessary for proper monopulse tracking operation, is also to be used to compensate for phase differences due to channel characteristics. Any such phase differences between the channels can be tuned out by means of control knob 35.

The device of the invention would typically be operated as follows: The operator would first attempt to locate the target with switch 28 in the "normal" position. If he suspects that the target is hidden under clutter, he should throw switch 28 to the "clutter reject" position. He then will tune variable phase shifter 33, by means of knob 35, to minimize the clutter. It will be impossible to "tune out" the target by means of knob 35. It will remain on the indicator as the clutter is minimized. If the target should leave the clutter area, switch 28 should be returned the "normal" position. In the absence of clutter, the target alone will generate no quadrature. Normal sum video is always generated and such video can be observed in the "normal" position.

Figure 3:
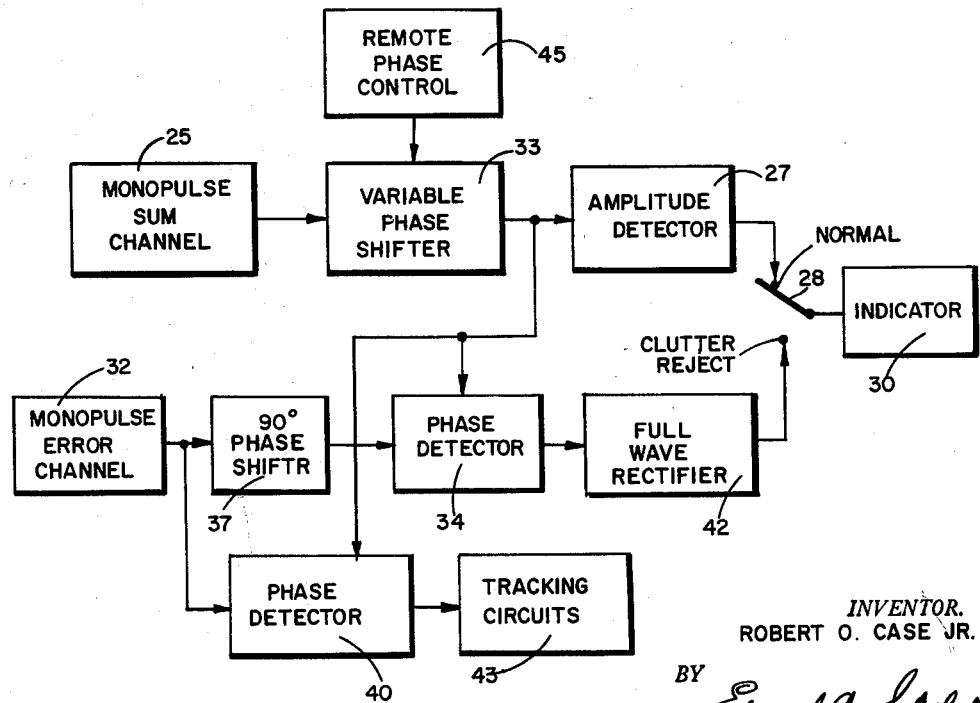
FIG. 3 is a block diagram illustrating a second embodiment of the device of the invention.

Referring now to FIG. 3, a second embodiment of the device of the invention is shown. Like numerals are used to identify similarly functioning components in the various illustrated embodiments. This embodiment is the same as that of FIG. 2, except for the location of 90 degree phase shifter 37 and variable phase shifter 33, and the addition of a remote phase control 45 for variable phase shifter 33. In the embodiment of FIG. 3, 90 degree phase shifter 37 is interposed between monopulse error channel 32 and phase detector 34 rather than between the output of sum channel 25 and the phase detector as in FIG. 2. In addition, the variable phase shifter 33 is incorporated in the monopulse sum channel rather than in the monopulse error channel. As already noted, it is immaterial where the phase shift is accomplished as long as the proper phase relationship between the two signals fed to the phase detector is attained. Therefore, the 90 degree phase shifter and the variable phase shifter can be located in either channel. As phase shifter 33 is generally located in I-F or R-F circuitry which is installed in a position remote from the cockpit position, in most installations it will be necessary to provide a remote phase control 45 to control variable phase shifter 33 so that the pilot can "tune out" the clutter. The operation of the embodiment of FIG. 3 is similar to that of FIG. 2.

Referring now to FIG. 4, a third embodiment of the device of the invention is illustrated. This embodiment is similar to that of FIG. 2, except for the elimination of variable phase shifter 33 and the addition of variable phase shifter 49 in place of 90 degree phase shifter 37. Variable phase shifter 49 is used to accomplish the functions of both 90 degree phase shifter 37 and variable phase shifter 33 by providing 90 degree phase shift with an adjustment enabling variation of the effective phase shift about this value. Otherwise, the embodiment of FIG. 4 functions the same as that of FIG. 2.

To clearly indicate how the device of the invention can be incorporated in a typical monopulse radar system, a monopulse radar system having the embodiment of FIG. 4 incorporated therein is illustrated in FIG. 5. Radar echoes are received by radar antenna 50 and fed to R-F bridge 52. R-F bridge 52 processes the received signals. The sum channel signals are fed to sum channel mixer 56 and the elevation error channel signals to elevation error channel mixer 54. Such a system will also generally have an azimuth error channel which will receive signals from R-F bridge 52, but as this channel is not involved in the operation of the device of applicant's invention, such an azimuth channel is not shown. Interposed in the elevation error channel may be a variable phase shifter 53 which is used to compensate for phase shift differences in the sum and elevation channels which might cause elevation tracking errors. Local oscillator 57 provides a local oscillator signal for both the sum channel mixer 56 and the elevation error channel mixer 54.

The output of sum channel mixer 56 is fed to I-F amplifier 59, thence to amplitude detector 37, and for normal video display through switch 28 to indicator 30. For normal tracking, the output of elevation error channel mixer 54 is fed to I-F amplifier 60 and thence to phase detector 40 where the elevation error is detected. The output of phase detector 40 is fed to the elevation tracking circuits 43.

For the detection of target signals in the presence of clutter, switch 28 is thrown to the "clutter reject" position. The output of I-F amplifier 59 is simultaneously fed to phase shifter 67 and variable gain amplifier 65. Phase shifter 67 may be a conventional phase shifter such as, for example, a fixed section of coaxial line. Variable gain amplifier 65 is a conventional amplifier capable of amplifying signals at the intermediate frequency. The gain of amplifier 65 is varied by means of remote gain control 66. Remote gain control 66 may comprise a potentiometer used to change the bias voltage to variable gain amplifier 65 thereby varying the gain of this amplifier.

The output of variable gain amplifier 65 and the output of phase shifter 67 are fed to summing amplifier 69. The output of variable gain amplifier 65 should be a signal in-phase with the output of I-F amplifier 59 and having an amplitude in accordance with the setting of remote gain control 66. The output of summing amplifier 69 is the vectorial sum of the two input signals fed thereto. The phase shift produced by phase shifter 67 should be such that when the output of the phase shifter is vectorially added to nominal values of the output of variable gain amplifier 65 a signal having a quadrature relationship to the output of I-F amplifier 59 is produced. A change in the amplitude of the output signals fed from variable gain amplifier 65 will produce an effective phase shift in the output signals for summing amplifier 69 in view of the fact that these signals are vectorially added to the output of phase shifter 67 in amplifier 69. Thus, by varying the gain of amplifier 65 the phase of the reference signal fed from summing amplifier 69 to phase detector 34 can be varied about a nominal quadrature relationship with the normal tracking signals in the elevation error channel. Remote gain control 66 can thus be used to compensate for phase differences between the elevation and sum channels. The output of summing amplifier 69 is fed as a reference signal to phase detector 34, where as explained with reference to the other figures, the quadrature component of the error channel signal is extracted.

It is to be noted that FIG. 5 only illustrates one of many ways in which the device of the invention may be incorporated into a monopulse radar system and is given by way of illustration and example only. The embodiments of FIGS. 2 and 3 can be incorporated into a conventional monopulse system by techniques well known to those skilled in the art.

The device of this invention has an advantage over moving target indication type devices in that there is no requirement that the target be moving relative to the radar. The device of this invention works as well, for example, for a hovering object as a moving one. There is a requirement, however, that there be some elevation separation between the target and the clutter. Such elevation separation is not required in the operation of the conventional moving target indicator. It is to be noted that if the device of this invention is combined with moving target indicator techniques, the clutter rejection capabilities of both systems can be combined to give a more powerful sub-clutter visibility than either technique alone can offer. With such a combination, the detection of non-moving targets can be accomplished through the device of the invention while moving targets which are not elevated relative to the clutter can be detected by moving target indicator techniques. For targets which both have elevation separation from the clutter and which are moving, both techniques will contribute substantially to enable the detection of a target in the presence of clutter.

The device of the invention thus provides a simple yet highly effective means for detecting target signals in the presence of clutter. This system can readily be incorporated into existing monopulse radars, adds little to the cost of such systems, and does not significantly detract from their reliability.

While the invention has been described and illustrated in detail, it is to be clearly understood that the same is by way of illustration and example only and is not to be taken by way of limitation, the spirit and scope of this invention being limited only by the terms of the appended claims.

I claim:
1. A device for use in a monopulse radar system for facilitating the detection of target signals in the presence of clutter, said monopulse radar having sum and error channels and an indicator, comprising means for detecting the quadrature component of the signals in said error channel, said quadrature detecting means being responsive to signals from said sum channel with respect to signals from said error channel, and means for alternatively coupling the output of said quadrature detecting means or the output of said sum channel to said indicator.

2. The device as recited in claim 1 and further comprising a variable phase shifter connected between one of said radar channels and said quadrature detecting means.

3. The device as recited in claim 1 wherein said quadrature detecting means comprises a phase detector and means for phase shifting signals from said sum channel by 90 degrees, the output of said phase shifting means being fed to said phase detector as a reference signal, the output of said error channel being fed to said phase detector as an input signal.

4. A device for use in a monopulse radar system for facilitating the detection of target signals in the presence of clutter, said monopulse radar having sum and elevation error channels and an indicator, comprising means for detecting the quadrature component of the signals in said elevation error channel, said quadrature detecting means being responsive to signals from said sum channel with respect to signals from said error channel, means for detecting the output of said sum channel, a full wave rectifier connected to receive the output of said quadrature detecting means, and means for alternatively connecting the output of said rectifier or the output of said sum channel detecting means to said indicator.

5. The device as recited in claim 4 wherein said quadrature detecting means comprises a phase detector and a 90 degree phase shifter, said phase shifter being interposed between said sum channel and said phase detector.

6. In a monopulse radar system, a sum channel, an elevation error channel, means for varying the phase of the output signals from one of said channels relative to the phase of the output signals from the other of said channels, a phase detector, 90 degree phase shifter means for 90 degree phase shifting signals from said sum channel and coupling said phase shifted signals to said phase detector, the output of said elevation error channel being coupled to said phase detector, said phase detector having an output indicative of the phase difference between the signals fed thereto from said sum and elevation error channels, a full wave rectifier connected to receive the output of said phase detector, an indicator, and means for alternatively coupling the output of said phase detector or the output of said sum channel to said indicator.

7. The device as recited in claim 6 wherein said phase varying means is connected to receive the sum channel output.

8. The device as recited in claim 6 wherein said phase varying means is connected to receive the elevation error channel output.

9. In a monopulse radar system, a sum channel, an elevation error channel, means for varying the phase of the output signals from one of said channels relative to the phase of the output signals from the other of said channels, a phase detector, 90 degree phase shifter means for 90 degree phase shifting signals from said sum channel and coupling said phase shifted signals to said phase detector, the output of said error channel being coupled to said phase detector, said phase detector having an output indicative of the phase difference between the signals fed thereto from said sum and error channels, a full wave rectifier connected to receive the output of said phase detector, an amplitude detector connected to receive the output of said sum channel, an indicator, and means for alternatively coupling the output of said phase detector or the output of said amplitude detector to said indicator.

10. In a monopulse radar system having a sum channel, an elevation error channel and indicator means for displaying radar echo signals, a device for minimizing clutter effects comprising a phase detector, signals from each of said channels being fed to said phase detector for phase comparison, means interposed between one of said channels and said phase detector for phase shifting the signals fed therefrom to said phase detector by 90 degrees relative to the signals fed to said phase detector from the other of said channels, and means for alternatively coupling the output of said phase detector or the output of said sum channel to said indicator means, whereby the output of said phase detector represents the quadrature component of the error channel signal with respect to the sum channel signal produced by interference between target and clutter signals.

11. The device as recited in claim 10 wherein said phase shifting means comprises a variable phase shifter.

No references cited.